United States Patent Office 3,341,528
Patented Sept. 12, 1967

3,341,528
SUBSTITUTED BENZOQUINOLINES
John Shavel, Jr., Mendham, and Glenn Curtis Morrison, Dover, N.J., assignors to Warner-Lambert Pharmaceutical Company, Morris Plains, N.J., a corporation of Delaware
No Drawing. Filed Nov. 7, 1963, Ser. No. 322,013
5 Claims. (Cl. 260—240)

This invention relates to a new and novel class of substituted benzoquinolines. More particularly, this invention relates to new and novel tetrahydrobenzo[d,e]quinolin-7-ones having the formula:

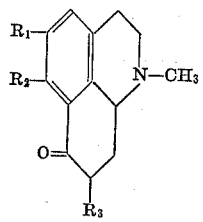

wherein $R_1$ represents lower alkoxy such as methoxy, ethoxy and the like; $R_2$ represents hydroxy or benzoyloxy and $R_3$ represents hydrogen or halo-substituted phenyl such as p-chlorophenyl and to the nontoxic pharmaceutically acceptable acid addition salts thereof.

This invention also encompases within its scope a novel process for the production of these substituted quinolines and novel intermediates obtained during their synthesis.

The novel compounds of our invention exhibit interesting and significant pharmacological activity and are useful as analgesics or anti-inflamatory agents.

In ddition, they are valuable starting materials for the production of other substituted benzoquinolines.

In accordance with our invention the compounds of this invention may be prepared by the following reaction sequence.

First, an N-methyl-3,4-di-loweralkoxy substituted phenethylamine is reacted with diethyl succinate to obtain a succinamate of the formula:

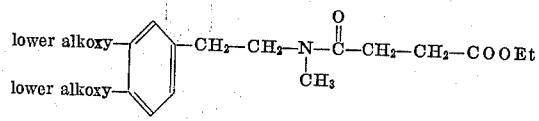

This reaction is generally effected by application of heat at a temperature of about 200° C. for about 4 hours.

The above succinamate may also be prepared by reacting succinic anhydride with the 3,4-di-loweralkoxy substituted N-methylphenethylamine followed by treatment with ethanol and sulfuric acid.

The second step involves ring closure of I above with agents such as phosphorous oxychloride followed by catalytic reduction to obtain a tetrahydroisoquinoline of the formula:

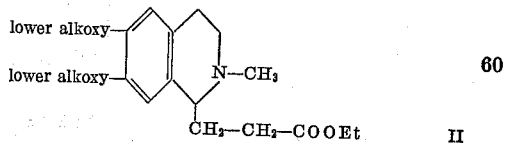

This ring closure reaction is generally carried out under reflux for about 60 to 70 minutes employing a solvent such as toluene. The reaction product is not isolated but is dissolved in acetic acid and reduced directly with gaseous hydrogen at atmospheric pressure in the presence of a suitable catalyst such as platinum oxide. When hydrogen uptake ceases the desired tetrahydroisoquinoline is recovered by filtering off the catalyst and removing the solvent in vacuo.

Lastly, a further ring closure reaction is applied to II employing polyphosphoric acid to form a tetrahydrobenzoquinoline-7-one of the formula:

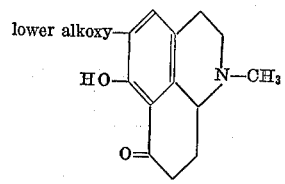

The above reaction is preferably carried out in an atmosphere of nitrogen and effected at a temperature range of about 170° to 180° C.

The derivative wherein $R_2$ is benzoyl may then be readily prepared by treating III with benzoyl chloride.

In order to obtain those compounds of this invention wherein $R_3$ is halo-substituted phenyl, a halo-phenylsuccinic anhydride such as p-chlorophenylsuccinic anhydride is employed as the starting material instead of succinic anhydride but employing analogous reaction conditions. The resulting compound V has the following structural formula:

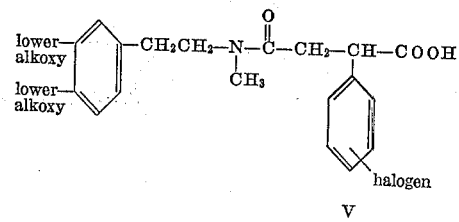

Compound V is then heated with acidic ethanol for about 3 hours to form the ester which is cyclized by refluxing with phosphorous oxychloride in toluene or a similar solvent such as xylene. The resulting reaction product has the formula:

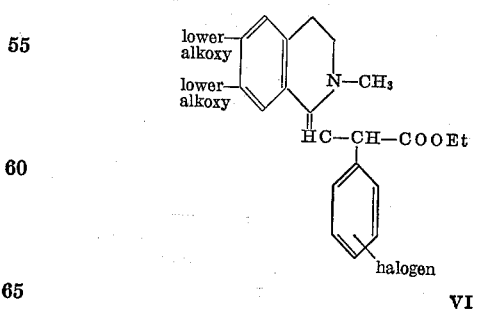

Compound VI is then reduced employing gaseous hydrogen at atmospheric pressure in the presence of a catalyst such as platinum to obtain a compound of the formula:

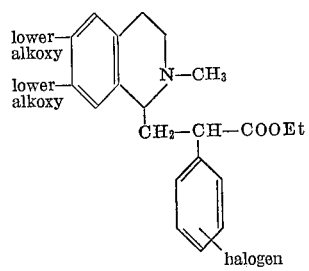

VII

Further treatment of VII with polyphosphoric acid gives the desired benzoquinoline of the formula:

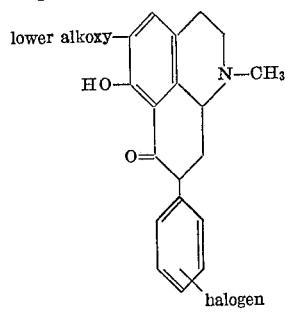

The foregoing reaction steps may be conveniently represented in the following schematic diagram:

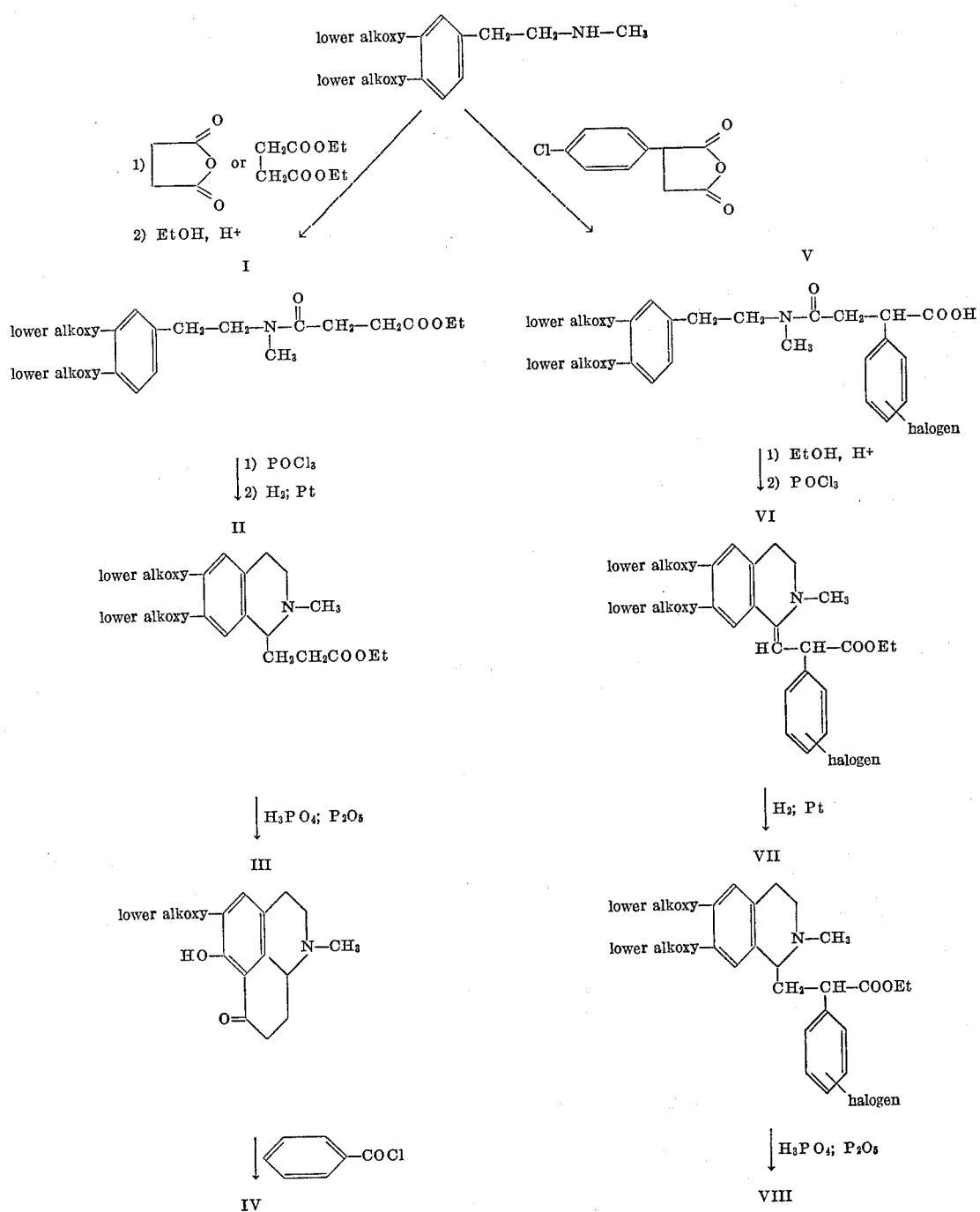

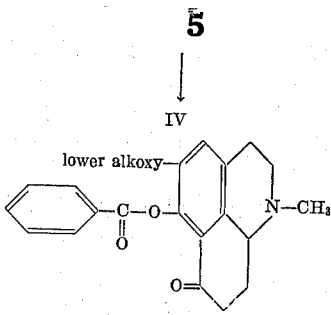

↓ IV

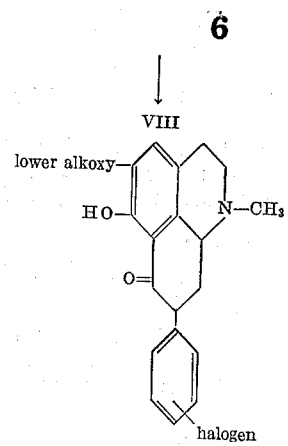

↓ VIII

The compounds of our invention may be converted into their pharmaceutically acceptable nontoxic acid addition and quaternary ammonium salts by conventional procedures. Exemplary of nontoxic acid addition salts are those formed with maleic, fumaric, succinic, tartaric, citric, malic, cinnamic, sulfonic, hydrochloric, hydrobromic, sulfuric, phosphoric and nitric acids. The acid addition salts may be prepared in the conventional manner by treating a solution of suspension or suspension of the free base in an organic solvent with the desired acid and then recovering the salt which forms by crystallization techniques. The quaternary salts are prepared by heating a suspension of the free base in a solvent with a reactive halide such as methyl iodide, ethyl bromide, n-hexyl bromide, benzyl chloride or a reactive ester such as methyl sulfate, ethyl sulfate or methyl p-toluene sulfonate.

For therapeutic use, our compounds, either as the free base or in the form of salts, may be combined with conventional pharmaceutical diluents and carriers to form such dosage units as tablets, capsules, suppositories, elixirs, solutions or suspensions.

The following examples are included in order further to illustrate the present invention:

*Example 1.—Ethyl N-(3,4-dimethoxyphenethyl)-N-methyl-succinamate A from diethyl succinate*

A mixture of 195 g. of N-methyl-3,4-dimethoxyphenethylamine and 1 kg. of diethyl succinate is heated at 200° C. for 4 hours. Distillation gives 156 g. (47%) of ethyl N-(3,4-dimethoxyphenethyl)-N-methylsuccinamate as a colorless oil, B.P. 195° C. (0.25 mm.);

$\nu_{max.}^{film}$: 765, 805, 860, 1640, 1705 cm.$^{-1}$; $\nu_{max.}^{CHCl_3}$: 1640, 1705 cm.$^{-1}$; $\lambda_{max.}^{EtOH}$: 229 m$\mu$ (8,900), 279 (2,800)

Analysis for $C_{17}H_{25}NO_5$: Calc. C, 63.14; H, 7.79; N, 4.34. Found C, 63.04; H, 8.00; N, 4.33.

(B) *From succinic anhydride.*—To a slurry of 50 g. of succinic anhydride in 100 ml. of benzene is added a solution of 97.5 g. of 3,4-dimethoxyphenethyl-N-methylamine in 100 ml. of benzene at a rate such that the temperature does not rise above 50° C. Stirring is continued for 30 minutes and then the solution is refluxed for an additional 30 minutes. The reaction mixture is dissolved in 450 ml. of ethanol containing 3 ml. of sulfuric acid and refluxed for two hours while part of the overhead is taken off to remove water. The ethanol is removed in vacuo and the residue poured into bicarbonate solution, saturated with sodium chloride, and extracted twice with 250 ml. portions of benzene. The benzene layers are combined, dried over sodium sulfate and the solvent removed. Distillation of the residue gives 127 g. (79%) of ethyl N-(3,4-dimethoxyphenethyl)-N-methylsuccinamate as a colorless oil, B.P. 195° C. (0.25 mm.).

*Example 2.—Ethyl 1,2,3,4-tetrahydro-6,7-dimethoxy-2-methyl-1-isoquinolinepropionate*

To a refluxing solution of 50.4 g. of phosphorous oxychloride in 90 ml. of toluene is added, over a 30 minute interval, a solution of 97 g. of ethyl-N-(3,4-dimethoxyphenethyl)-N-methylsuccinamate in 90 ml. of toluene. Refluxing is continued for an additional 75 minutes. The reaction mixture is poured into 600 ml. of ice water, the temperature allowed to rise to 25° C. and held there until there is no exotherm upon removal of the cooling bath. The aqueous layer is made basic with 50% sodium hydroxide solution and extracted three times with 200 ml. portions of chloroform. The chloroform layers are combined, dried over soduim sulfate and the solvent removed. The residue is dissolved in 150 ml. of acetic acid, 500 mg. of platinum oxide added and hydrogenated at atmospheric pressure. Hydrogen uptake is constant after 0.20 (65%) equivalents of hydrogen has been absorbed. The catalyst is filtered and the solvent is removed in vacuo. Distillation of the residue gives 49 g. (53%) of ethyl 1,2,3,4-tetrahydro-6,7 - dimethoxy - 2 - methyl - 1 - isoquinolinepropionate as a colorless oil, B.P. 172°–185° C. (0.25 mm.). Redistillation gives an analytical sample, B.P. 170° C. (0.25 mm.);

$\nu_{max.}^{film}$: 780, 790, 865, 1730 cm.$^{-1}$; $\nu_{max.}^{CHCl_3}$: 1725 cm.$^{-1}$; $\lambda_{max.}^{EtOH}$: 227 m$\mu$ (8,400), 279 (2,600)

Analysis for $C_{17}H_{25}NO_4$: Calc. C, 66.42; H, 8.20; N, 4.56. Found: C, 66.52; H, 8.33; N, 4.61.

The hydrochloride is formed by treating ethyl 1,2,3,4-tetrahydro-6,7 - dimethoxy - 2 - methyl-1-isoquinoline-propionate in ether with hydrogen chloride and recrystallized from ethanol as a white crystalline solid, M.P. 194°–196° C.

Analysis for $C_{17}H_{26}NO_4Cl$: Calc. C, 59.38; H, 7.62; N, 4.07. Found C, 59.57; H, 7.62; N, 3.90.

*Example 3.—2,3,9,9a-tetrahydro-6-hydroxy-5-methoxy-1-methyl-1H-benzo-[d,e]quinolin-7-(8H)-one*

To 96 ml. of 85% phosphoric acid stirred in a nitrogen atmosphere is added 150 g. of phosphorus pentoxide. The temperature is adjusted to 170° C. and 65 g. of ethyl 1,2,3,4 - tetrahydro - 6,7 - dimethoxy - 2 - methyl - 1 - isoquinolinepropionate added over a three minute interval. The temperature is held at 170° to 180° C. for an additional eight minutes. The reaction mixture is rapidly cooled to room temperature, 600 ml. of ice water added and the temperature held at 25° C. until complete solution is obtained. The solution is neutralized with 30% sodium hydroxide solution to pH 7.5 (approx.) and extracted with three 100 ml. portions of chloroform. The extracts are combined, dried over sodium sulfate and the solvent removed. Trituration of the residue with 70 ml. of petroleum ether gives 21.0 g. (30%) of 2,3,9,9a-tetrahydro-6 - hydroxy - 5 - methoxy - 1 - methyl - 1H - benzo - [d,e] - quinolin-7-(8H)-one as a solid, M.P. 94.5°–97.5° C. Recrystallization from Skelly B gives a light yellow crystalline solid, M.P. 105°–105.5° C.;

$\nu_{max.}^{Nujol}$: 1630 cm.$^{-1}$; $\nu_{max.}^{CHCl_3}$: 1638 cm.$^{-1}$; $\lambda_{max.}^{EtOH}$: 227 m$\mu$ (16,000), 272 (8,100), 364 (3,560); $\lambda_{max.}^{1NNaOH}$: 239 m$\mu$ (16,700), 279 (5,400), 390 (5,800)

Analysis for $C_{14}H_{17}NO_3$: Calc. C, 67.99; H, 6.93; N, 5.66. Found C, 68.00; H, 7.22; N, 5.86.

The hydrochloride is formed in methanol by reacting the free base with hydrochloric acid and further recrystallization gives a white crystalline solid, M.P. 272° C.

Analysis for $C_{14}H_{18}NO_3Cl$: Calc. C, 59.26; H, 6.39; N, 4.94; Cl, 12.50. Found C, 59.01; H, 6.39; N, 5.10; Cl, 12.39.

*Example 4*

The benzoate of 2,3,9,9a - tetrahydro - 6 - hydroxy - 5 - methoxy-1-methyl-1H-benzo-[d,e]quinolin-7-(8H)-one is formed in pyridine from reacting the free base with benzoyl chloride and after recrystallization from benzene Skelly B is obtained as a light tan crystalline solid, M.P. 175.5°–177° C.;

$\nu_{max.}^{Nujol}$: 1685, 1738 cm.$^{-1}$; $\nu_{max.}^{CHCl_3}$: 1690, 1740 cm.$^{-1}$; $\lambda_{max.}^{EtOH}$: 223 m$\mu$ (29,000) 255 (shoulder 7,250) 326 (3,560)

Analysis for $C_{21}H_{21}NO_4$: Calc. C, 71.77; H, 6.02; N, 3.99. Found C, 71.83; H, 6.07; N, 3.82.

*Example 5.—2-(p-chlorophenyl)-N-(3,4-dimethoxyphenethyl)-N-methylsuccinamic acid*

To a solution of 52.5 g. of p-chlorophenylsuccinic anhydride in one liter of ether is added a solution of 107 g. of 3,4-dimethoxyphenethylamine in 100 ml. of ether, with cooling such that the temperature remains between 20° and 25° C. The mixture is then stirred for one hour. The ether is decanted from the precipitated gum and 500 ml. of water is added followed by 40 ml. of 40% sodium hydroxide solution. The resulting solution is acidified by the dropwise addition of 10% hydrochloric acid. The precipitated gum is taken up in benzene, washed with water, dried over sodium sulfate and the solvent removed. The residue is dissolved in 275 ml. of ethanol and on standing there is deposited 55 g. (55%) of 2-(p-chlorophenyl) - N - (3,4 - dimethoxyphenethyl) - N - methylsuccinamic acid as a crystalline solid, M.P. 147°–149° C. Further recrystallization gives an analytical sample, M.P. 151.5°–153° C.;

$\nu_{max.}^{Nujol}$: 1595, 1730 cm.$^{-1}$; $\nu_{max.}^{CHCl_3}$: 1640, 1712 cm.$^{-1}$; $\lambda_{max.}^{EtOH}$: 221 m$\mu$ (19,400), 275 (3,000)

Analysis for $C_{21}H_{24}ClNO_5$: Calc. C, 62.15; H, 5.92; N, 3.45; Cl, 8.73. Found C, 62.17; H, 6.08; N, 3.28; Cl, 8.93.

*Example 6.—Ethyl α-(p-chlorophenyl)-1,2,3,4-tetrahydro-6,7-dimethoxy-2-methyl-Δ1,β-isoquinolinepropionate*

A solution of 25.3 g. of 2-(p-chlorophenyl)-N-3,4-dimethoxyphenethyl)-N-methylsuccinamic acid and 1 ml. of sulfuric acid in 200 ml. of ethanol is refluxed for three hours. After removal of the solvent in vacuo on the steam bath, the residue is treated with 100 ml. of saturated sodium bicarbonate solution and benzene. The solvent is removed from the benzene layer and the residue refluxed in a solution of 25 ml. of phosphorous oxychloride and 100 ml. of xylene for two hours. The reaction mixture is poured into 500 ml. of ether with stirring, the ether decanted and the precipitate treated with 500 ml. of water. The solution is filtered, made basic with ammonium hydroxide and extracted with ether. The ether layer is washed with water, dried over sodium sulfate and the solvent removed. There remained 6.5 g. (27%) of ethyl α-(p-chlorophenyl) - 1,2,3,4 - tetrahydro - 6,7-dimethoxy-2-methyl-Δ1,β-isoquinolinepropionate as a viscous gum. On long standing crystallization occurred. Recrystallization from ethanol gives an analytical sample, M.P. 134°–139° C.;

$\nu_{max.}^{Nujol}$: 1600, 1620, 1730 cm.$^{-1}$; $\lambda_{max}^{EtOH}$ (base added to pH 11): 246–270 m$\mu$ (plateau 4,000); $\lambda_{max.}^{EtOH}$ 0.1 N HCl: 219 m$\mu$ (17,000), 247 (12,800), 308 (5,200), 360 (7,700)

Analysis for $C_{23}H_{26}NO_4Cl$: Calc. C, 66.42; H, 6.30; N, 3.37; Cl, 8.53. Found C, 66.38; H, 6.33; N, 3.34; Cl, 8.51.

*Example 7.—Ethyl α - (p-chlorophenyl)-1,2,3,4-tetrahydro - 6,7 - dimethoxy-2-methyl-1-isoquinolinepropionate hydrochloride*

To a solution of 6.5 g. of ethyl α-(p-chlorophenyl)-1,2,3,4 - tetrahydro - 6,7 - dimethoxy-2-methyl-Δ1,β-isoquinolinepropionate in 50 ml. of acetic acid is added 100 mg. of platinum oxide and the mixture hydrogenated. After 0.02 mol of hydrogen has been absorbed uptake ceases. The catalyst is filtered and the solvent removed in vacuo. The residue is dissolved in 100 ml. of water, made basic with ammonium hydroxide and extracted with ether. The ether layer is washed with water, dried over sodium sulfate and the solvent removed. The residue is dissolved in 15 ml. of ethanol and made acidic with hydrogen chloride. There is deposited 5.1 g. (85%) of ethyl α-(p-chlorophenyl) - 1,2,3,4-tetrahydro-6,7-dimethoxy-2-methyl-1-isoquinolinepropionate hydrochloride as a crystalline solid, M.P. 174°–181° C. Two more recrystallizations from ethanol gives an analytical sample of a mixture of two stereoisomers, M.P. 179°–185° C $\nu_{max.}^{Nujol}$: 1720, 1728, 2420 cm.$^{-1}$; $\lambda_{max.}^{CHCl_3}$: 224 m$\mu$ (18,600), 283 (4,000), 290 (shoulder 3,200)

Analysis for $C_{23}H_{29}NO_4Cl_2$: Calc. C, 60.79; H, 6.43; N, 3.08; Cl, 15.61. Found C, 60.67; H, 6.20; N, 3.17; Cl, 15.58.

Isomer A is obtained by fractional crystallization from ethanol as a crystalline solid, M.P. 190°–191.5° C.

$\nu_{max.}^{Nujol}$: 1728, 2420 cm.$^{-1}$; $\lambda_{max.}^{EtOH}$: 221 m$\mu$ (18,600), 283 (3,700), 289 (shoulder 3,200)

Analysis for $C_{23}H_{29}NO_4Cl_2$: Calc. C, 60.79; H, 6.43; N, 3.08; Cl, 15.61. Found C, 61.00; H, 6.45; N, 3.17; Cl, 15.81.

*Example 8.—8 - (p-chlorophenyl)-2,3,9,9a-tetrahydro-6-hydroxy - 5 - methoxy-1-methyl-1H-benzo[d,e]quinolin-7-(8H)-one*

To a solution of 210 g. of phosphorous pentoxide in 134.5 ml. of 85% phosphoric acid is added 10.0 g. of ethyl α - (p - chlorophenyl) - 1,2,3,4 - tetrahydro - 6,7-dimethoxy-2-methyl-Δ1,β-isoquinolinepropionate hydrochloride at 173° C. (bath temperature) in a nitrogen atmosphere. After stirring for nine minutes, the reaction mixture is rapidly cooled to 25° C., poured into 900 ml. of ice water and partially neutralized with 280 ml. of 40% sodium hydroxide solution (pH still 2). Filtration gives a solid which is shaken with a mixture of 300 ml. of 5% soduim bicarbonate solution and 300 ml. of chloroform. The chloroform layer is dried over sodium sulfate and the solvent removed. The residue is digested with 25 ml. of hot ethanol. After cooling, there remained 0.35 g. (3.5%) of 8-(p-chlorophenyl)-2,3,9,9a-tetrahydro-6-hydroxy - 5 - methoxy - 1-methyl-1H-benzo[d,e]quinoline-7-(8H)-one as a crystalline solid, M.P. 193° C. dec. Recrystallization from ethanol gives an analytical sample, M.P. 175° dec.;

$\nu_{max.}^{Nujol}$: 812, 1600, 1628 cm.$^{-1}$; $\lambda_{max.}^{EtOH}$: 225 m$\mu$ (24,400); 267 (11,400); 367 (3,890); $\lambda_{max.}^{0.1\ N\ NaOH}$: 237 m$\mu$ (shoulder 23,000); 285 (7,440); 372 (7,440)

Analysis for $C_{20}H_{20}NO_3Cl$: Calc. C, 67.13; H, 5.63; N, 3.91. Found C, 66.92; H, 5.76; N, 3.78.

It is understood that the foregoing detailed description is given merely by way of illustration and that many variations may be made therein without departing from the spirit of our invention.

Having described our invention, what we desire to secure by Letters Patent is:

1. A compound selected from the group consisting of those having the formula:

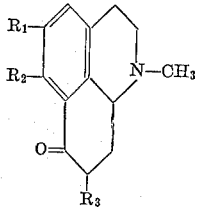

wherein $R_1$ is straight chain lower alkoxy, $R_2$ is a member of the group consisting of hydroxy and benzoyloxy and $R_3$ is a member of the group consisting of hydrogen and chloro substituted phenyl and the nontoxic pharmaceutically acceptable acid addition salts thereof.

2. 2,3,9,9a - tetrahydro - 6-hydroxy-5-methoxy-1-methyl-1H-benzo[d,e]quinolin-7-(8H)-one.

3. 2,3,9,9a - tetrahydro - 6-hydroxy-5-methoxy-1-methyl-1H-benzo[d,e]quinolin-7-(8H)-one benzoate.

4. 8 - (p - chlorophenyl)-2,3,9,9a-tetrahydro-6-hydroxy-5-methoxy-1-methyl-1H-benzo[d,e]quinolin-7-(8H)-one.

5. A compound of the formula:

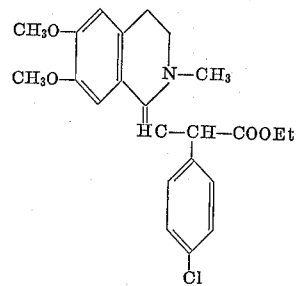

References Cited
UNITED STATES PATENTS 3,205,233   9/1965   Clarkson _____ 260—289
3,231,566   1/1966   Nagata _____ 260—289

OTHER REFERENCES

Oine et al., Chem. Pharm. Bull., vol. 11, pp. 541–3 (1963) as abstracted in Chem. Abstracts, vol. 59, col. 11420 (1964).

ALEX MAZEL, *Primary Examiner.*
D. G. DAVIS, *Assistant Examiner.*